US011285393B1

(12) United States Patent
Chemistruck et al.

(10) Patent No.: US 11,285,393 B1
(45) Date of Patent: Mar. 29, 2022

(54) CUE-BASED ACOUSTICS FOR NON-PLAYER ENTITY BEHAVIOR

(71) Applicant: Microsoft Technology Licensing, LLC, Redmond, WA (US)

(72) Inventors: Michael George Chemistruck, Issaquah, WA (US); Nikunj Raghuvanshi, Redmond, WA (US); Kyle Robert Storck, Kirkland, WA (US); Noel Richard Cross, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/225,014

(22) Filed: Apr. 7, 2021

(51) Int. Cl.
*A63F 13/54* (2014.01)
*A63F 13/57* (2014.01)

(52) U.S. Cl.
CPC .............. *A63F 13/54* (2014.09); *A63F 13/57* (2014.09)

(58) Field of Classification Search
CPC .. A63F 13/54; A63F 13/57; A63F 2300/6063; A63F 2300/6081
USPC .......................................................... 463/35
See application file for complete search history.

(56) References Cited

U.S. PATENT DOCUMENTS 9,154,896 B2 * 10/2015 Mahabub .................. H04S 5/00
9,711,126 B2 * 7/2017 Mehra ..................... A63F 13/54
9,807,725 B1 * 10/2017 Vitus ......................... G01S 1/00
10,616,705 B2 * 4/2020 Schmidt ................... G06F 3/167
10,779,082 B2 * 9/2020 Audfray ............... H04R 29/001
10,852,838 B2 * 12/2020 Bradski ................. H04N 13/189
2018/0192226 A1 * 7/2018 Woelfl ..................... H04R 5/02

OTHER PUBLICATIONS

Chaitanya, et al., "Directional Sources and Listeners in Interactive Sound Propagation using Reciprocal Wave Field Coding", In Journal of ACM Transactions on Graphics, vol. 39, Issue 4, Article 44, Jul. 2020, 14 Pages.
Raghuvanshi, et al., "Parametric Wave Field Coding for Precomputed Sound Propagation", In Journal of ACM Transactions on Graphics, vol. 33, Issue 4, Article 38, Jul. 2014, 11 Pages.

* cited by examiner

*Primary Examiner* — Allen Chan
(74) *Attorney, Agent, or Firm* — Alleman Hall Creasman & Tuttle LLP

(57) ABSTRACT

Examples are disclosed that relate to determining acoustic properties of audio sources in virtual environments. One example provides a method comprising receiving a query on behalf of a non-player entity regarding an audio source, the query including a position of the non-player entity, and based at least on the position of the non-player entity, determining one or more acoustic properties of sound emitted by the audio source at the position of the non-player entity by accessing a position-indexed data structure comprising one or more values for one or more audio cues, each value influencing a corresponding acoustic property of sound emitted by the audio source at a corresponding position. The method further comprises providing the one or more determined acoustic properties to the application, where the application is configured to control behavior of the non-player entity based at least on the one or more determined acoustic properties.

20 Claims, 7 Drawing Sheets

CUE-BASED ACOUSTICS FOR NON-PLAYER ENTITY BEHAVIOR

BACKGROUND

Some computer applications have non-player entities with artificial intelligence or other capacities that cause the entities to exhibit behaviors in response to stimuli in a virtual environment. As one example, a videogame may have a non-player character that responds to sound emitted in a virtual environment of the videogame.

DETAILED DESCRIPTION

Figure 1:
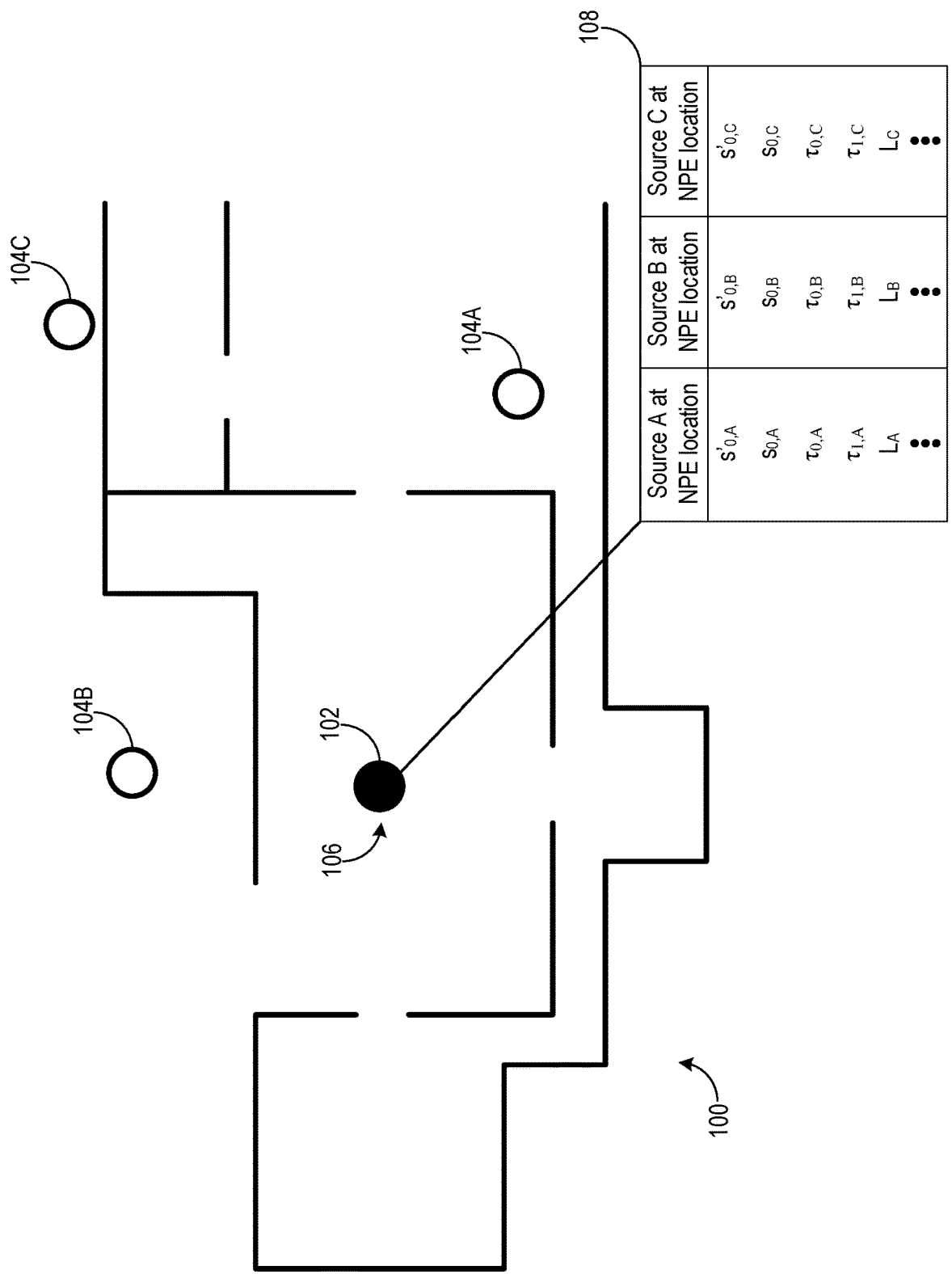
FIG. 1 depicts a plan view of an example virtual environment occupied by a non-player entity and audio sources.

Some applications provide non-player entities (NPEs) with artificial intelligence or other capacities that cause the entities to exhibit behaviors in response to various stimuli in a virtual environment. As one example, a videogame may provide a non-player character (NPC) with a simulated hearing ability and whose virtual behavior is responsive to whether that entity can "hear" sound emitted in a virtual environment of the videogame. To this end, the videogame may determine, for each of a number of audio sources in the virtual environment, whether that audio source can be heard by the NPC. A variety of mechanisms have been developed for determining the audibility of audio sources from the perspective of NPCs. One such mechanism deems an audio source audible by an NPC if the distance between the audio source and NPC is less than or equal to a threshold distance, and inaudible if the distance is greater than the threshold distance. Such mechanisms tend to produce unconvincing or unrealistic NPC behavior, however. For example, an audio source that is within the threshold distance to an NPC may be considered audible by the NPC despite substantial occlusion of the audio source (e.g., by geometry in the virtual environment) attenuating sound emitted by the audio source to an extent that the audio source should in fact be inaudible to the NPC.

Another mechanism for determining whether a source can be heard includes raycasting to determine whether an audio source is "visible" from the perspective of an NPC (e.g., checking line-of-sight). However, a relatively large number of rays may be required to accurately determine audibility—particularly as the number of audio sources and NPCs increases—which may incur high computational cost. On the other hand, fewer rays may lead to the incorrect assessment that an audio cannot be heard if the rays are occluded by small objects, when in fact the audio source can be heard along non-occluded paths that diffract around the objects. Further, combining raycasting with distance-based evaluation may fail to produce correct audibility results—for example, the distance-based check may indicate that an audio source is audible, yet raycasting may indicate the audio source is inaudible as the path(s) taken by rays between the audio source and NPC are occluded by geometry. The binary indication of audibility produced by these and other mechanisms fail to represent more complex and subtle acoustic properties of sound, such as attenuation, diffraction, and reverberation.

Other approaches to providing NPC behavior that is responsive to audio render the propagation of audio itself in real-time and train NPCs to interpret sound. For example, the physical propagation of sound through a virtual environment may be simulated to produce a binaural audio signal for an NPC. A mechanism such as a neural network may be trained to allow the NPC to interpret the audio signal. Such approaches tend to occur high computational expense at levels that may be prohibitive for real-time NPC function, however, and pose unsolved challenges to implementing NPC cognition that properly responds to such audio signals.

Accordingly, examples are disclosed that relate to determining acoustic properties of sound emitted by audio sources based on the values of audio cues. As described below, an audio cue may indicate various aspects of sound such as loudness, directionality, decay time, energy transfer, and/or reverberation. These and other potential audio cues may assume values that vary as the position of a listener changes in a virtual environment, enabling the assessment of acoustic properties of sound at a plurality of positions in the virtual environment.

For a particular listener such as an NPE at a particular position in a virtual environment, a query may be received on behalf of the NPE regarding an audio source in the virtual environment. Acoustic properties of sound emitted by the audio source—as experienced at the position of the NPE—may be determined by accessing a position-indexed data structure that includes audio cue values determined at the NPE position. The determined acoustic properties may then be provided—as audio cue values and/or as acoustic information derived from audio cue values—to the application, which controls behavior of the NPE based at least on the determined acoustic properties. Further, audio cue values for corresponding positions in a virtual environment may be provided for each of a plurality of audio sources, enabling an assessment of how an NPE experiences sound at their location due to any number of audio sources. By assessing acoustic properties of sound through audio cues, a more granular and descriptive indication of sound may be provided to applications and NPEs than binary indications of audibility. This in turn may enable a significantly wider and more realistic range of NPE behaviors.

In some examples, the audio cue values provided for one or more audio sources may be pre-computed prior to their use by an application. As described below, an offline physical simulation of sound propagation from audio sources in a virtual environment may be conducted to derive audio cue values corresponding to those audio sources. Acoustic properties of the audio sources may then be determined based on the audio cue values at the position of an NPE in real-time on behalf of an application providing the NPE. Such an approach to pre-computing audio cue values relieves the acoustic property determination process of the computational burden associated with the physical simulation of acoustic propagation, while retaining the greatly increased descriptiveness of acoustics and expanded range of NPE behaviors enabled by audio cues. Further, as the offline physical simulation may be conducted using geometry comprising the virtual environment for which acoustic properties are desired, a highly accurate depiction of acoustics in the virtual environment may be obtained, capturing geometric and/or material details of the environment as well as acoustic phenomena such as occlusion, diffraction, and attenuation.

FIG. 1 depicts an example virtual environment 100 occupied by an NPE 102 and a plurality of audio sources 104. A plan view is shown, illustrating geometry corresponding to various features (e.g., walls) in virtual environment 100. Virtual environment 100, as well as NPE 102 and audio sources 104, may be provided by an application executed on any suitable computing device. As such, audio sources 104 in the depicted example are virtual audio sources that emit virtual sound in virtual environment 100. The application may assume any suitable form, such as that of a videogame. In such examples, NPE 102 may be an NPC separate from a player character controlled by a player of the videogame. The NPC may exhibit any suitable behavior in relation to the player character, including but not limited to engaging in combat with the player character, conversing with the player character, and aiding the player character. In examples in which the application includes a player character, one or more audio sources 104 may correspond to or be controlled by the player character—for example, an audio source may correspond to a weapon controlled by the player character, in which case the NPC may selectively respond to sound emitted by the weapon. Where a player character is included, sound emitted in virtual environment 100 may be selectively heard (e.g., provided to in an audible manner) by the player character and NPE 102, by one of the player character and NPE, or by neither the player character and NPE. In other examples, the application may not include a player character. As such, the audio sources discussed herein may arise in virtual environments that do not have user-controlled player characters.

NPE 102 is configured to exhibit behavior in the application based at least on one or more audio sources 104 in virtual environment 100. To this end, the application issues a query on behalf of NPE 102 regarding the acoustic properties, as experienced at the NPE's location, of sound emitted by one or more audio sources 104. The query may be issued in response to any suitable trigger, such as a change in NPE 102 and/or player character state, a change in application and/or virtual environment 100 state, or at regular intervals. In general, such a query may be useful at any time it is desired that an NPE hear and potentially respond to sound from an audio source. The query includes a position 106 of NPE 102 in virtual environment 100. The position of NPE 102 may act as an index into a data structure that is indexed at least by NPE position and includes values for audio cues corresponding to one or more audio sources 104, where audio cue values are determined for a plurality of positions in virtual environment 100. In the example depicted in FIG. 1, the query issued on behalf of NPE 102 yields—at least by way of position 106—the respective values taken at position 106 by a set of audio cues for three audio sources 104A, 104B, and 104C, as shown at a table 108.

The value of an audio cue influences one or more acoustic properties of sound emitted by an audio source 104 as those acoustic properties are experienced at the position in environment 100 for which the value is determined. As examples, the value of a directionality-based audio cue at a position in virtual environment 100 may influence how localizable an audio source 104 is at the position, while the value of a frequency-based audio cue at the position may influence how audible frequencies of the audio source are at the position. Accordingly, the evaluation of audio cues provides a mechanism by which the acoustic properties of audio sources 104—as heard at particular positions—may be determined. As described below, the determination of acoustic properties of an audio source 104 may include providing audio cue values to the requesting application. In some examples, the determination of acoustic properties of an audio source 104 may alternatively or additionally include deriving information (e.g., source localizability, perceived source location, source clarity) from audio cue values, where derived information may also be provided to the requesting application. Example audio cues are described below with reference to FIG. 2, and example NPE behaviors that may be determined based on audio cues are described below with reference to FIG. 4.

As described above, the values of the audio cues assessed in the example depicted in FIG. 1 vary as a function of the position 106 of NPE 102. In some examples, audio cue values may vary as a function of other parameters relating to audio sources 104 and/or NPE 102, including but not limited to the position of an audio source, the (e.g., angular) orientation of an audio source, the orientation of the NPE, a state (e.g., of an audio source, NPE, and/or the application providing virtual environment 100), time, and frequency (e.g., of sound emitted by an audio source). As such, audio cues may provide a substantially comprehensive summarization of acoustics in environment 100 for a wide variety of circumstances in which audio sources and listeners (e.g., NPE 102) engage in one or more of translation, rotation, changes in state, and changes in time.

Figure 2:
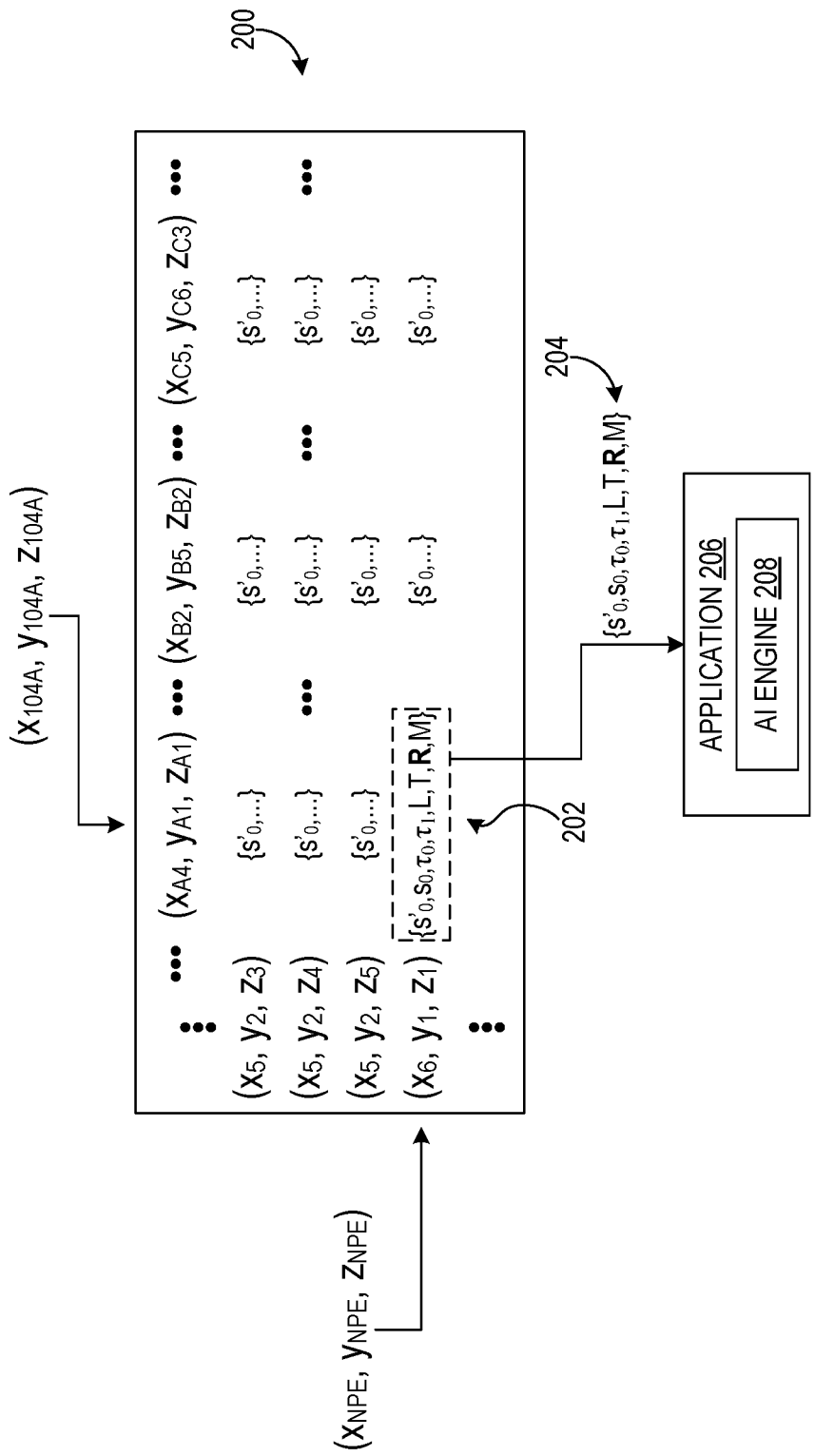
FIG. 2 illustrates access to a data structure to obtain audio cue values for the position of the non-player entity of FIG. 1.

FIG. 2 illustrates access to a data structure 200 to obtain audio cue values for position 106 of NPE 102 corresponding to sound emitted by audio source 104A from the position of the audio source 104A in virtual environment 100. As shown therein, data structure 200 is indexed along the vertical axis by NPE position, and is indexed along the horizontal axis by audio source 104 position. Data structure 200 is thus referred to as a position-indexed data structure. Accordingly, data structure 200 is accessed to obtain audio cue values at NPE position 106 for sound emitted by audio source 104A from the position of the audio source by indexing into the data structure with the NPE position and the position of the audio source 104A. In the depicted example, NPE and audio source positions are shown in the form of three-dimensional Cartesian coordinates, but may assume any suitable form. Indexing into data structure 200 with NPE position 106 and the position of audio source 104A yields a set of values 202 for eight respective audio cues 204 at the NPE position corresponding to sound emitted by the audio source. The set of values 202 are then provided to an application 206 that provides virtual environment 100, NPE 102, and audio sources 104. Application 206 may implement an artificial intelligence (AI) engine 208 that controls behavior of NPE 102 based at least on acoustic properties of audio source 104A, where the acoustic properties may include one or more of the values 202 and/or information derived from the value(s).

As described above, audio cue values may vary as a function of parameters other than position, including but not limited to the (e.g., angular) orientation of an audio source, the orientation of an NPE, a state (e.g., of an audio source, NPE, and/or application 206), time, and frequency. In such examples, data structure 200 may be indexed and thereby accessed by one or more of such parameters in addition to NPE and audio source position. Further, as shown in the example depicted in FIG. 2, data structure 200 may provide audio cue values, for each of a plurality of positions in virtual environment 100, of each audio source 104 in the virtual environment. In such examples, data structure 200 may be indexed into via NPE position, an identification of selected audio source(s) for which audio cue values are desired, and the respective position(s) of the selected audio source(s). Data structure 200 may thus enable access to audio cue values for substantially all NPE positions and substantially all positions of each audio source 104—e.g., all positions for which audio cue values are determined—as well as simultaneously service queries on behalf of multiple NPEs. Providing audio cue values in data structure 200 for each audio source 104 may further allow the process of computing the audio cue values to forego any assessment of which audio sources will be active at runtime (e.g., of application 206). In other examples, a respective data structure for each audio source may be provided, with each data structure comprising audio cue values corresponding to acoustic properties of its corresponding audio source. It will be understood that data structure 200 may be implemented in any suitable manner—e.g., as a database or lookup table.

In some examples, data structure 200 may be stored in a compressed format. In such examples, access to data structure 200 may include decompressing portions of the data structure relevant to a query prompting the access—e.g., portions corresponding to a spatial region occupied by an NPE. At least some of the decompressed portions may be cached (e.g., according to a least-recently-used policy). Any suitable compression scheme may be used to compress data structure 200, such as Lempel-Ziv-Welch (LZW).

Any suitable audio cue(s) may be used to implement the approaches described herein. In the example depicted in FIG. 2, the set of audio cues 204 used for audio source 104A include an initial direction ($s'_0$) from which sound emitted by the audio source propagates, an listener direction ($s_0$) in which NPE 102 is oriented, an onset delay ($\tau_0$) indicating the duration (e.g., in seconds) taken for sound emitted by the audio source to travel to the NPE, a reflections delay ($\tau_1$) indicating the duration (e.g., in seconds) from the time at which the audio source starts to emit sound until the NPE hears the first reverberation, a loudness (L) of sound emitted by the audio source as heard by the NPE at the NPE position, a reverberation decay time (T) indicating the duration (e.g., in seconds) taken for reverberation of the sound emitted by the audio source to decay by a threshold magnitude (e.g., 60 dB) from the maximum loudness of the emitted sound, a reflections transfer matrix (R) indicating the reverberation power of sound emitted by the audio source as heard by the NPE in each of a plurality of directions (e.g., North, South, East, West, Up, Down), and a measure (M) of sound emitted by the audio source that travels directly through a wall (or other geometry) between the audio source and NPE. In some scenarios, the sound indicated by M may be muffled, substantially quieter, and different in frequency content as compared to sound traveling along paths that diffract around walls/geometry through air, for example.

As mentioned above, audio cue values for a virtual environment may be derived from a physical simulation of acoustic propagation in that environment. To derive the values of audio cues 204, a physical simulation of acoustic propagation in virtual environment 100 may be carried out. In some examples, this simulation may be carried out in an offline manner, such that the values of audio cues 204 are pre-computed prior to execution of application 206. The simulation may be performed as various parameters are varied, such as audio source position and audio source orientation. The simulation may take as input, for each audio source, a source directivity function capturing its far-field radiation pattern. Further, the simulation may be performed using the geometry comprising virtual environment 100. As such, a descriptive assessment of acoustics tailored to virtual environment 100 may be obtained. In some examples, the simulation may consider other aspects of virtual environment 100, such as its material properties.

In some examples, a set of one or more audio cues such as the set of audio cues 204 may relate to the types of information extracted by the human auditory system in perceiving sound. Audio cues 204 in particular may substantially summarize what is extracted from sound perceived by the human auditory system and thus parameterize the human perception of sound. Accordingly, the use of audio cues 204 by application 206 may enable a diverse array of NPE behaviors that realistically and convincingly respond to sound. As part of controlling NPE behavior, application 206 may control the perceptual acuity of an NPE through the selective use of audio cues 204.

Figure 3A:
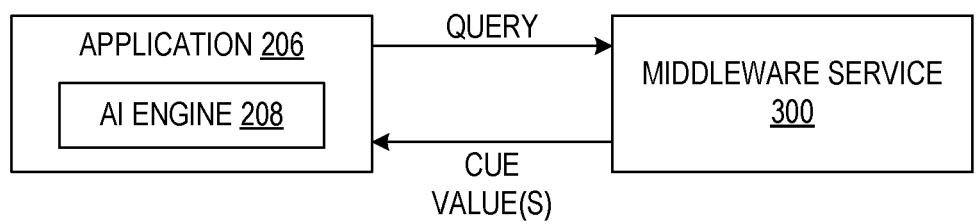
FIGS. 3A-3B illustrate various implementations of determining audio cue values.

The real-time determination of audio cue values may be implemented in any suitable manner. FIG. 3A illustrates examples in which the determination of audio cue values is implemented at a middleware service 300 implemented separately from application 206. In such examples, application 206 may issue a query regarding acoustic properties of one or more audio sources, along with at least the position of an NPE. In response, middleware service 300 replies with acoustic properties (e.g., one or more values of one or more audio cues and/or information derived therefrom) of sound emitted by the audio source(s). Middleware service 300 may be implemented in any suitable manner, for example as a cloud computing service. As another example, middleware service 300 may be implemented in a software development kit (SDK). The SDK may be used to build virtual environments, for example, and may integrate functionality to perform physical simulations of acoustic propagation in the virtual environments with which audio cue values may be derived and made available to AI engine 208 of application 206.

Figure 3B:
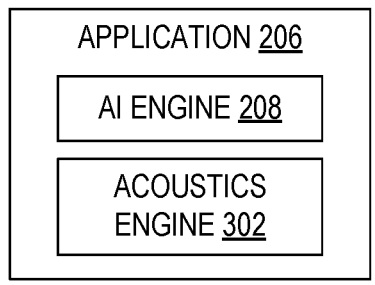

In other examples, application 206 may determine audio cue values itself, as illustrated in FIG. 3B. In such examples, application 206 may direct a query regarding acoustic properties of one or more audio sources to an acoustics engine 302 implemented by application 206. Acoustics engine 302 may determine acoustic properties by accessing data structure(s) comprising audio cue value(s), where cue value(s) and/or information derived therefrom may then be made available to AI engine 208.

For implementations in which application 206 is executed and audio cue values are determined at a common processor or other logic device, application execution and cue value determination may be performed at different processor threads. For example, application 206 may be executed at a main thread, while audio cue value determination (whether performed by the application or another application or service) may be performed at a background thread, which passes replies to the main thread to service queries regarding audio sources issued on behalf of the application. In such examples, queries may be queued from the main thread and execute in batches at the background thread. Further, the background thread may schedule higher priority queries first, such as those for which audio cue values are most stale. Where conditions are met that do not merit a query—such as when the position of an audio source and an NPE have not changed since a prior query—audio cue values previously determined for the prior query may be reused. Moreover, queries may not be issued for audio sources that are inactive—i.e., are not emitting sound.

Figure 4:
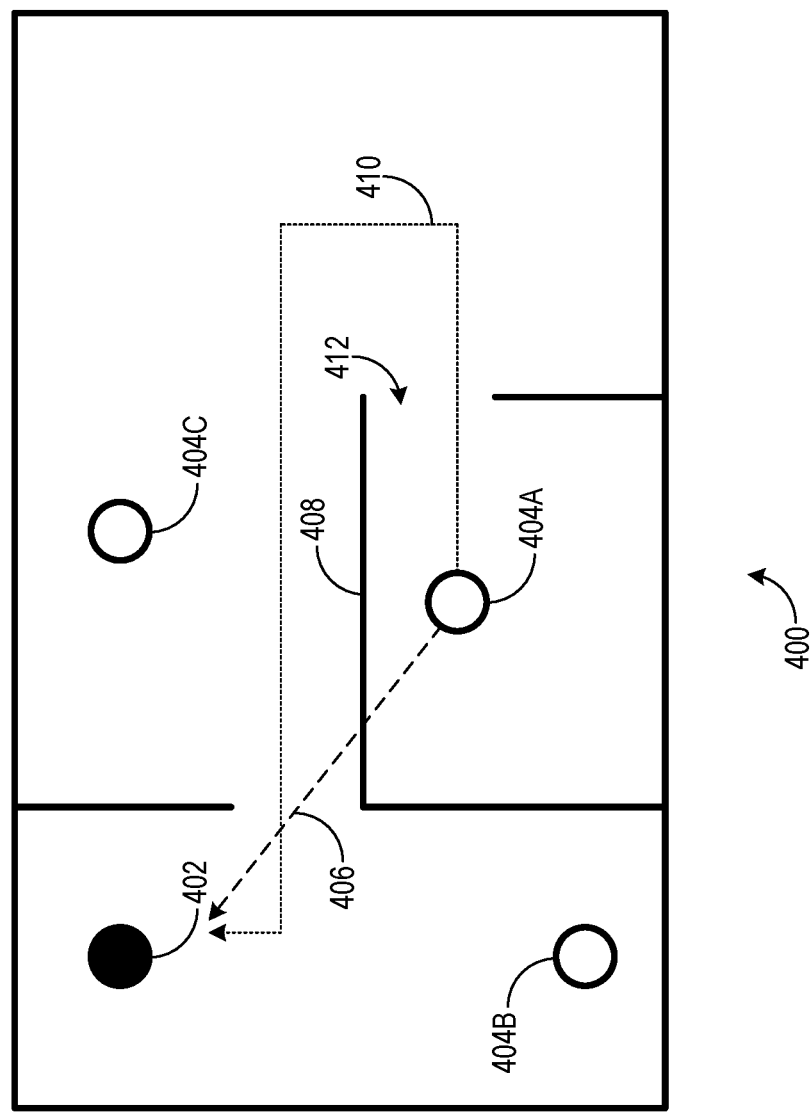
FIG. 4 depicts a plan view of another example virtual environment occupied by a non-player entity and audio sources.

As an illustration of various behavioral outcomes that may be determined for an NPE in an application based on acoustic properties, FIG. 4 depicts a plan view of an example virtual environment 400 occupied by an NPE 402 and three audio sources 404. In one example scenario, an audio source 404A emits sound that travels to NPE 402 along two paths: a transmitted path 406 extending through a wall 408 between the NPE and audio source, and an indirect path 410 extending through a doorway 412 and diffracting around the wall 408. One or more audio cue values (e.g., of a directionality-based cue) indicate the presence of both paths 406 and 410 at the position of NPE 402. An application (e.g., application 206) providing NPE 402 and audio sources 404 may control behavior of the NPE based on paths 406 and 410. As one example, the application may determine, based on the audio cue value(s), that the acoustic properties of sound emitted by audio source 404A as heard at the NPE position are such that sound transmitted along indirect path 410 is inaudible to NPE 402, while sound transmitted along transmitted path 406 is audible but muffled. The application may cause NPE 402 to react to the sound along transmitted path 406, for example by moving toward the perceived origin of the transmitted path. As sound along transmitted path 406 is muffled, the application may model confusion of NPE 402—for example, by causing the NPE to express confusion verbally.

In another example scenario with reference to FIG. 4, an audio cue may include a reverberation-based audio cue that indicates the directionality of reverberation for an audio source 404. In such a scenario, the reverberation-based audio cue may indicate that reverberation produced by sound emitted by audio source 404C is substantially omnidirectional as perceived at the position of NPE 402. Based on this audio cue, it may be determined (e.g., by the application providing NPE 402 and audio sources 404), that an acoustic property of audio source 404C at the NPE position includes a reduced ability or inability to localize the position of the audio source. Accordingly, the application may model confusion of NPE 402, for example by causing the NPE to traverse at least partially random or indirect paths in attempting to locate audio source 404C.

In another example scenario with reference to FIG. 4, an audio cue may include a frequency-based audio cue indicating frequency content of sound emitted by an audio source 404. In such a scenario, respective values for the frequency-based audio cue may be received for audio sources 404B and 404C. Where the respective values indicate that the frequency content of sound emitted by audio source 404B significantly differs from the frequency content of sound emitted by audio source 404C, the application may cause NPE 402 to react differently to sound emitted by audio source 404B as compared to sound emitted by audio source 404C. For example, the application may cause NPE 402 to understand and respond to audio source 404B, but fail to understand and respond to audio source 404C. As another example, the application may cause NPE 402 to understand both audio sources 404B and 404C when their respective values of the frequency-based audio cue indicate significantly differing frequency content, and cause the NPE to exhibit confusion when their respective values of the frequency-based audio cue indicate substantially similar frequency content.

In yet another example scenario, an application may model confusion of an NPE in response to the number of audio sources actively emitting sound being greater than or equal to a threshold number. In such a scenario, the number of active audio sources may be such that individual audio sources are unlocalizable—for example, the sound collectively emitted by the active audio sources and heard by an NPE may be perceived as being substantially omnidirectional, thus rendering individual audio sources unlocalizable.

Figure 5:
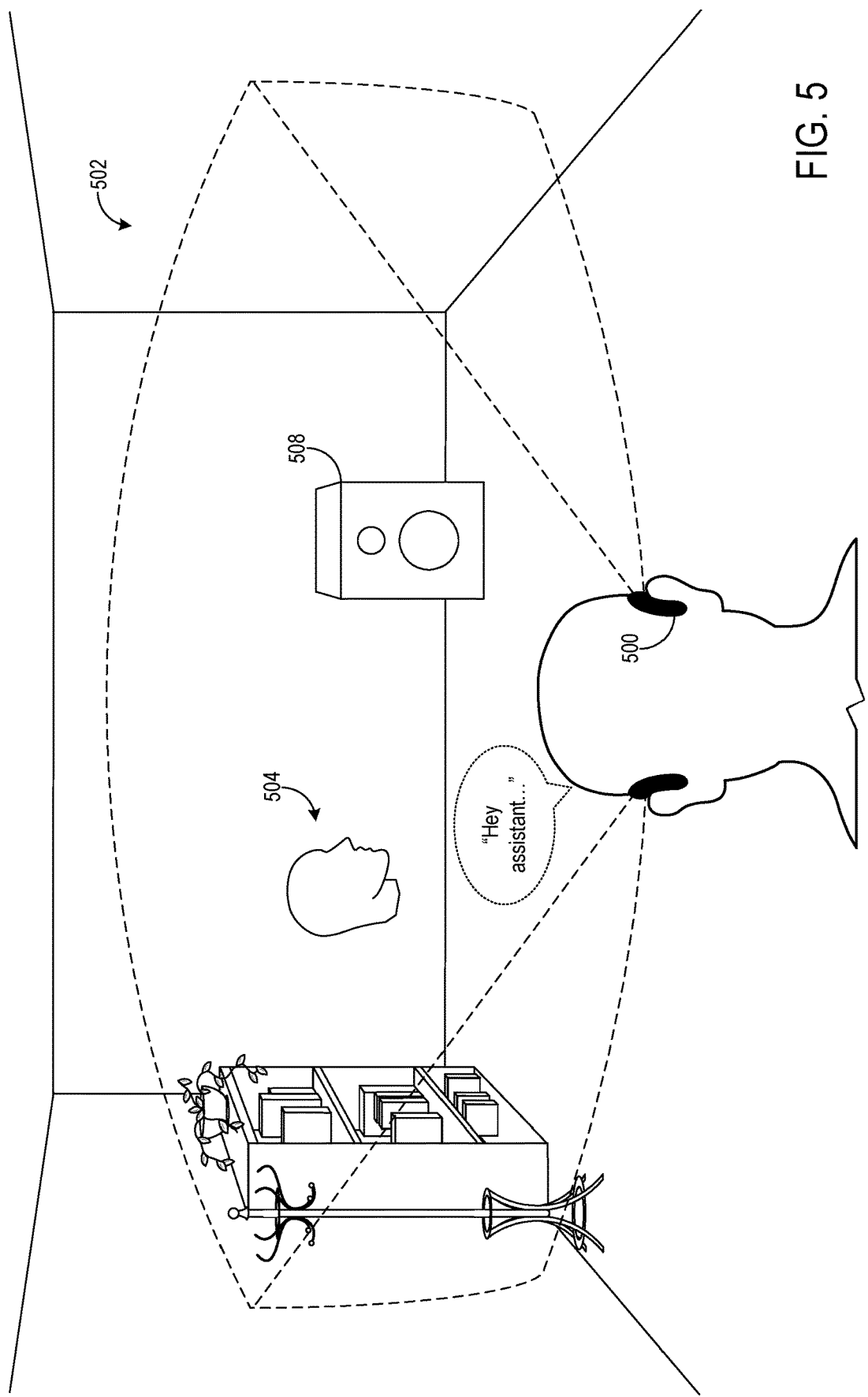
FIG. 5 illustrates the execution of a mixed reality application on a head-mounted display device.

In examples described above, audio cue values are determined for audio sources in virtual environments. Such virtual environments may be constructed from geometry comprising a level or modelled spaced in a videogame, or other geometry otherwise provided programmatically. In other examples, a virtual environment may be constructed based on a physical environment. FIG. 5 illustrates one such example in which a mixed reality application is executed on a head-mounted display (HMD) device 500. The mixed reality application may overlay or otherwise augment real imagery passing through an at least partially transparent display of HMD device 500 with virtual imagery, for example.

In the depicted example, a virtual environment is constructed based on sensor data representing a physical environment 502 occupied by HMD device 500. The sensor data may indicate one or more surfaces that form or occupy physical environment 502, for example in the form of a plurality of triangles or other primitives. The sensor data may be captured by a sensor system on-board HMD device 500, for example. From the sensor data, a virtual environment may be constructed that models or otherwise corresponds to physical environment 500. A physical simulation of acoustic propagation may be performed in the virtual environment for one or more audio sources provided by the mixed reality application to derive audio cue values for those audio sources. An NPE 504 provided by the mixed reality application may then respond to sound emitted by one or more of the audio sources based on acoustic properties of the audio sources as indicated at least by audio cue values.

In some examples, the mixed reality application may configure NPE 504 to respond to sound emitted by a physical audio source occupying physical environment 502. FIG. 5 depicts various example physical audio sources in the form of a user of HMD 500, shown as uttering a phrase directed to NPE 504, and a physical speaker 508. As the physical audio sources are not provided by the mixed reality application, audio cue values may not be available for those audio sources. Accordingly, a physical audio source may be matched (e.g., by the mixed reality application) to the closest corresponding audio source for which audio cue values are available. Any suitable criteria may be considered in performing the match, including but not limited to loudness, reverberation, frequency, and timing characteristics of sound emitted by the physical audio source.

It will be understood that an NPE may be configured to exhibit any suitable behavior in response to acoustic properties of one or more audio sources. Further examples include but are not limited to configuring an NPE to help a player character, hinder a player character, to seek the position of a player character or other NPE, and to avoid the position of a player character or other NPE. Further, an application may configure an NPE with varying abilities to hear sound and/or localize audio sources. In some examples, an application may configure an NPE to hear through walls, as may be the case with an NPE that assists a user in a mixed reality application. In other circumstances, the application may limit the ability of the NPE to hear sound to what a typical human would hear at the NPE position. Still further, other types of information such as metadata may be used to inform the control of NPE behavior. As one example, an identification of the type of sound (e.g., speech) being heard by an NPE may be provided to an application, which may affect how the NPE responds to the sound. It will also be understood that controlling the behavior of an NPE based on acoustic properties of an audio source may include configuring the NPE to not respond to sound emitted by the audio source (e.g., if the audio source is inaudible at the NPE position), in addition to configuring the NPE to respond to emitted sound.

Figure 6:
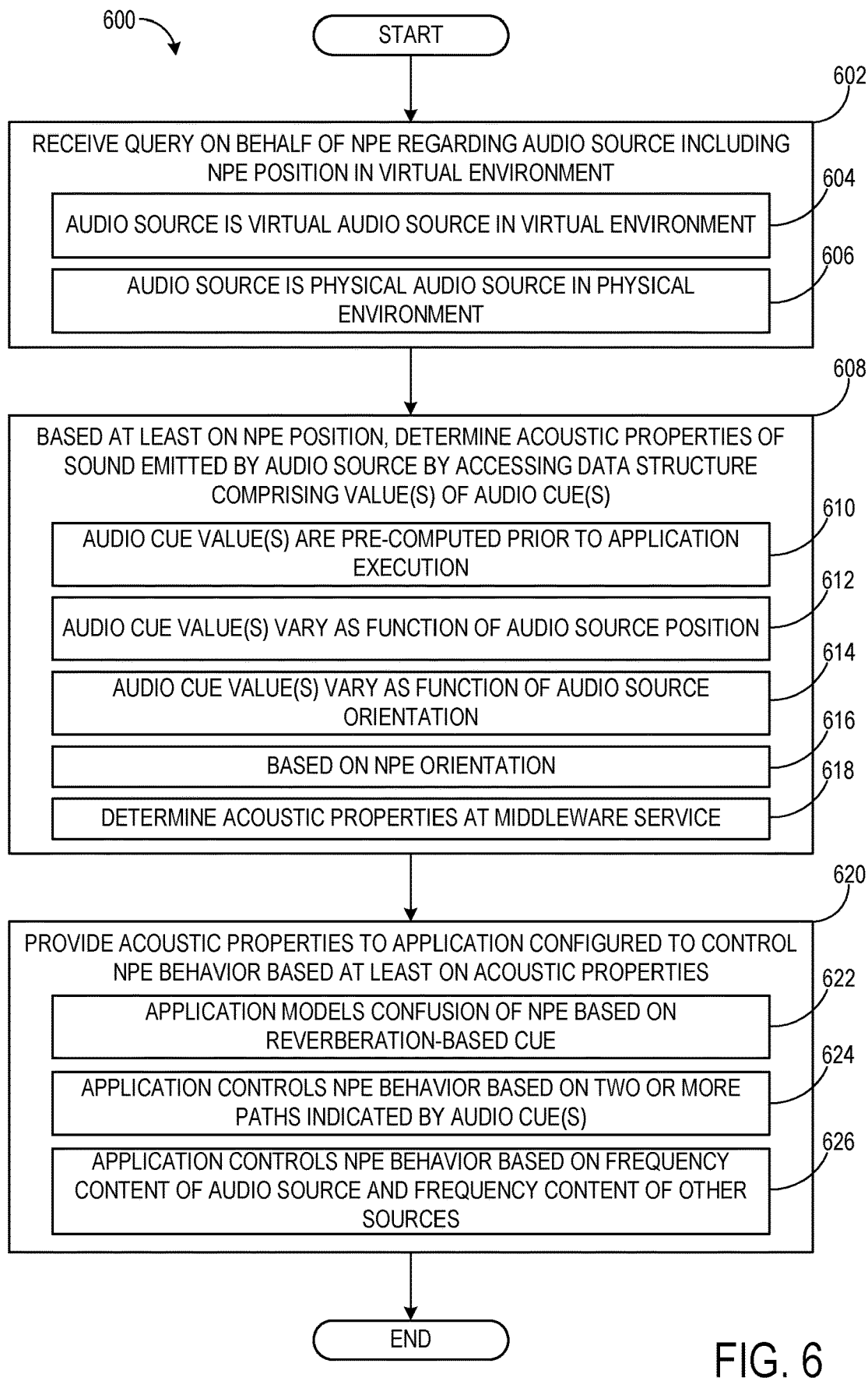
FIG. 6 depicts a flowchart illustrating a method of determining acoustic properties of an audio source.

FIG. 6 depicts a flowchart illustrating a method 600 of determining acoustic properties at an NPE position due to an audio source. Method 600 may be implemented at application 206 and/or middleware service 300 via any suitable computing device, for example.

At 602, method 600 includes receiving a query on behalf of an NPE regarding an audio source. The query includes a position of the NPE in a virtual environment. The NPE exhibits behavior in an application based at least on the audio source. The audio source may be a virtual audio source 604 in the virtual environment. The audio source may be a physical audio source 606 in a physical environment. In such examples, the virtual environment may be modeled based on the physical environment.

At 608, method 600 includes, based at least on the position of the NPE, determining one or more acoustic properties of sound emitted by the audio source at the position of the NPE by accessing a position-indexed data structure comprising one or more values for one or more audio cues, each value influencing a corresponding acoustic property of the audio source at a corresponding position in the virtual environment. The audio cue value(s) may be pre-computed 610 prior to execution of the application. Further, audio cue value(s) may vary as a function of one or more of the position 612 of the audio source and the orientation 614 of the audio source. The acoustic properties may be determined based further on the orientation 616 of the NPE. In some examples, the acoustic properties may be determined at a middleware service 618 implemented separately from the application. In some examples, the acoustic properties may be determined based on the position of the audio source in addition to the NPE position.

At 620, method 600 includes providing the one or more determined acoustic properties to the application, where the application is configured to control behavior of the NPE based at least on the one or more determined acoustic properties. In some examples, the one or more determined acoustic properties may include audio cue value(s) accessed at 608 without additional acoustic information (e.g., information derived from the cue value(s), in which case providing the one or more determined acoustic properties to the application may include providing the cue value(s) to the application without such additional information. In other examples, the one or more determined acoustic properties may include audio cue value(s) and additional acoustic information (e.g., localizability, clarity, perceived position of an audio source by an NPE), such that providing the one or more determined acoustic properties to the application may include providing the cue value(s) and the additional acoustic information to the application.

The application may model confusion 622 of the NPE based on a reverberation-based audio cue. The application may control 624 NPE behavior based on two or more paths, indicated by the audio cue(s), along which the sound emitted by the audio source travels to the position of the NPE. The application may control 626 NPE behavior based on the frequency content of the audio source and the frequency content of another audio source. In such examples, the audio cue(s) may include a frequency-based cue indicating frequency content of the sound emitted by the audio source, and the frequency content of sound emitted by the other audio source may be determined.

The approaches described herein may provide, through the use of audio cues, a highly descriptive assessment of the acoustics in a virtual environment. As described above, in some examples an audio cue set may model the human perception of sound, which may enable use of the audio cues—potentially without further processing of the cues or derivation of additional information from the cues—to facilitate complex, intelligent, and diverse NPE behaviors. However, through access to data structures that comprise audio cue values, the computational expense of performing physical simulations of acoustic propagation may be avoided during real-time execution of an application that utilizes audio cue values. Instead, such simulation may be performed offline prior to application execution, relegating this computational expense to the offline simulation. As such, the robust description of acoustics provided by audio cues may be facilitated at low computational expense, which may be particularly beneficial for contexts in which computing resources are limited (e.g., as with mobile computing devices). Moreover, the approaches described herein may scale for large numbers of NPEs and audio sources.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
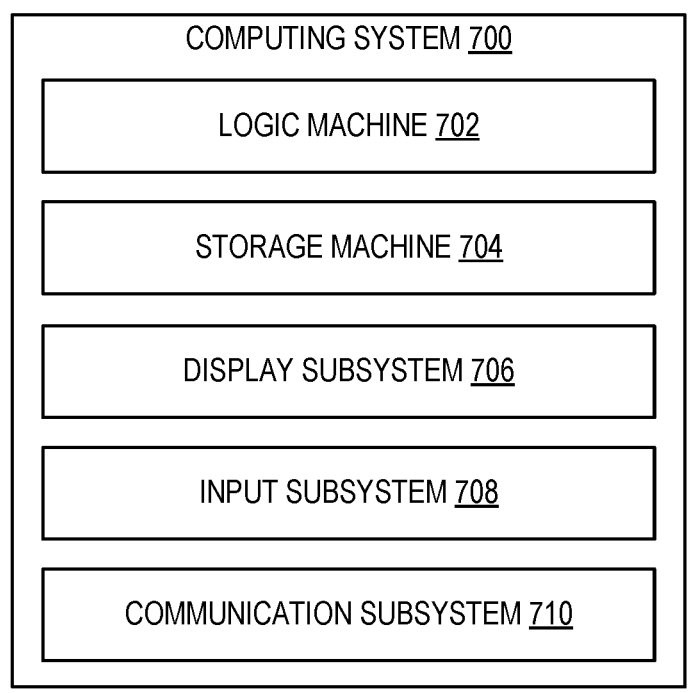
FIG. 7 schematically depicts an example computing system.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic machine 702 and a storage machine 704. Computing system 700 may optionally include a display subsystem 706, input subsystem 708, communication subsystem 710, and/or other components not shown in FIG. 7.

Logic machine 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 704 includes one or more physical devices configured to hold instructions executable by the logic machine to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic machine 702 executing instructions held by storage machine 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 706 may be used to present a visual representation of data held by storage machine 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic machine 702 and/or storage machine 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

Another example provides a method, comprising receiving a query on behalf of a non-player entity regarding an audio source, the query including a position of the non-player entity in a virtual environment, the non-player entity exhibiting behavior in an application based at least on the audio source, based at least on the position of the non-player entity, determining one or more acoustic properties of sound emitted by the audio source at the position of the non-player entity by accessing a position-indexed data structure comprising one or more values for one or more audio cues, each value influencing a corresponding acoustic property of sound emitted by the audio source at a corresponding position in the virtual environment, and providing the one or more determined acoustic properties to the application, where the application is configured to control behavior of the non-player entity based at least on the one or more determined acoustic properties. In such an example, the one or more values for the one or more audio cues may be pre-computed prior to execution of the application. In such an example, the one or more values for the one or more audio cues alternatively or additionally may vary as a function of a position of the audio source. In such an example, the one or more values for the one or more audio cues alternatively or additionally may vary as a function of an orientation of the audio source. In such an example, the one or more acoustic properties may be determined based further on an orientation of the non-player entity. In such an example, the one or more cues may include one or more of a direction from which the sound propagates, a direction in which the non-player entity is oriented, an onset delay indicating a duration for the sound to travel to the non-player entity, a reflections delay indicating a duration from a time at which the sound starts to be emitted until the non-player entity hears a first reverberation, a loudness of the sound as heard by the non-player, a reverberation decay time indicating a duration taken for reverberation of the sound to decay by a threshold magnitude from a maximum loudness of the sound, a reflections transfer matrix indicating a reverberation power of the sound as heard by the non-player entity in each of a plurality of directions, and a measure of sound emitted by the audio source that travels through geometry between the audio source and NPE. In such an example, the one or more audio cues may include a reverberation-based cue, and the application may be further configured to model confusion of the non-player entity based on the reverberation-based cue. In such an example, the one or more audio cues may indicate two or more paths along which the sound emitted by the audio source travels to the position of the non-player entity, and the application alternatively or additionally may be configured to control the behavior of the non-player entity based on the two or more paths. In such an example, the one or more audio cues may include a frequency-based cue indicating frequency content of the sound emitted by the audio source, and the method may further comprise determining frequency content of sound emitted by another audio source, where the application alternatively or additionally may be configured to control the behavior of the non-player entity based on the frequency content of the audio source and the frequency content of the other audio source. In such an example, the one or more acoustic properties of the sound emitted by the audio source may be determined at a middleware service implemented separately from the application. In such an example, the audio source may be a physical audio source occupying a physical environment.

Another example provides a computing system, comprising a logic processor, and a memory storing instructions executable by the logic processor to receive a query on behalf of a non-player entity regarding an audio source, the query including a position of the non-player entity in a virtual environment, the non-player entity exhibiting behavior in an application based at least on the audio source, based at least on the position of the non-player entity, determine one or more acoustic properties of sound emitted by the audio source at the position of the non-player entity by accessing a position-indexed data structure comprising one or more values for one or more audio cues, each value influenced by a corresponding acoustic property of sound emitted by the audio source at a corresponding position in the virtual environment; and provide the one or more determined acoustic properties to the application, where the application is configured to control behavior of the non-player entity based at least on the one or more determined acoustic properties. In such an example, the one or more values for the one or more audio cues may be pre-computed prior to execution of the application. In such an example, the one or more values for the one or more audio cues alternatively or additionally may vary as a function of a position of the audio source. In such an example, the one or more values for the one or more audio cues alternatively or additionally may vary as a function of an orientation of the audio source. In such an example, the one or more acoustic properties may be determined based further on an orientation of the non-player entity. In such an example, the one or more cues may include one or more of a direction from which the sound propagates, a direction in which the non-player entity is oriented, an onset delay indicating a duration for the sound to travel to the non-player entity, a reflections delay indicating a duration from a time at which the sound starts to be emitted until the non-player entity hears a first reverberation, a loudness of the sound as heard by the non-player, a reverberation decay time indicating a duration taken for reverberation of the sound to decay by a threshold magnitude from a maximum loudness of the sound, a reflections transfer matrix indicating a reverberation power of the sound as heard by the non-player entity in each of a plurality of directions, and a measure of sound emitted by the audio source that travels through geometry between the audio source and NPE. In such an example, the audio source may be a physical audio source occupying a physical environment.

Another example provides a method, comprising receiving a query on behalf of a non-player entity regarding an audio source, the query including a position of the non-player entity in a virtual environment, the non-player entity exhibiting behavior in an application based at least on the audio source, based at least on the position of the non-player entity, accessing a position-indexed data structure comprising one or more pre-computed values for one or more audio cues, each value influencing a corresponding acoustic property of sound emitted by the audio source at a corresponding position in the virtual environment, each value being pre-computed prior to execution of the application, and providing the one or more pre-computed values for the one or more audio cues to the application, where the application is configured to control behavior of the non-player entity based at least on the one or more pre-computed values. In such an example, the one or more pre-computed values for the one or more audio cues may vary as a function of one or more of a position of the audio source, an orientation of the audio source, and an orientation of the non-player entity.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method, comprising:
   receiving a query on behalf of a non-player entity regarding an audio source, the query including a position of the non-player entity in a virtual environment, the non-player entity exhibiting behavior in an application based at least on the audio source;
   based at least on the position of the non-player entity, determining one or more acoustic properties of sound emitted by the audio source at the position of the non-player entity by accessing a position-indexed data structure comprising one or more values for one or more audio cues, each value influencing a corresponding acoustic property of sound emitted by the audio source at a corresponding position in the virtual environment; and
   providing the one or more determined acoustic properties to the application, where the application is configured to control behavior of the non-player entity based at least on the one or more determined acoustic properties.

2. The method of claim 1, where the one or more values for the one or more audio cues are pre-computed prior to execution of the application.

3. The method of claim 1, where the one or more values for the one or more audio cues vary as a function of a position of the audio source.

4. The method of claim 1, where the one or more values for the one or more audio cues vary as a function of an orientation of the audio source.

5. The method of claim 1, where the one or more acoustic properties are determined based further on an orientation of the non-player entity.

6. The method of claim 1, where the one or more cues include one or more of a direction from which the sound propagates, a direction in which the non-player entity is oriented, an onset delay indicating a duration for the sound to travel to the non-player entity, a reflections delay indicating a duration from a time at which the sound starts to be emitted until the non-player entity hears a first reverberation, a loudness of the sound as heard by the non-player, a reverberation decay time indicating a duration taken for reverberation of the sound to decay by a threshold magnitude from a maximum loudness of the sound, a reflections transfer matrix indicating a reverberation power of the sound as heard by the non-player entity in each of a plurality of directions, and a measure of sound emitted by the audio source that travels through geometry between the audio source and NPE.

7. The method of claim 1, where the one or more audio cues include a reverberation-based cue, and where the application is configured to model confusion of the non-player entity based on the reverberation-based cue.

8. The method of claim 1, where the one or more audio cues indicate two or more paths along which the sound emitted by the audio source travels to the position of the non-player entity, and where the application is configured to control the behavior of the non-player entity based on the two or more paths.

9. The method of claim 1, where the one or more audio cues include a frequency-based cue indicating frequency content of the sound emitted by the audio source, the method further comprising determining frequency content of sound emitted by another audio source, where the application is configured to control the behavior of the non-player entity based on the frequency content of the audio source and the frequency content of the other audio source.

10. The method of claim 1, where the one or more acoustic properties of the sound emitted by the audio source are determined at a middleware service implemented separately from the application as a cloud computing service.

11. The method of claim 1, where the audio source is a physical audio source occupying a physical environment.

12. A computing system, comprising:
a logic processor; and
a memory storing instructions executable by the logic processor to:
receive a query on behalf of a non-player entity regarding an audio source, the query including a position of the non-player entity in a virtual environment, the non-player entity exhibiting behavior in an application based at least on the audio source;
based at least on the position of the non-player entity, determine one or more acoustic properties of sound emitted by the audio source at the position of the non-player entity by accessing a position-indexed data structure comprising one or more values for one or more audio cues, each value influenced by a corresponding acoustic property of sound emitted by the audio source at a corresponding position in the virtual environment; and
provide the one or more determined acoustic properties to the application, where the application is configured to control behavior of the non-player entity based at least on the one or more determined acoustic properties.

13. The computing system of claim 12, where the one or more values for the one or more audio cues are pre-computed prior to execution of the application.

14. The computing system of claim 12, where the one or more values for the one or more audio cues vary as a function of a position of the audio source.

15. The computing system of claim 12, where the one or more values for the one or more audio cues vary as a function of an orientation of the audio source.

16. The computing system of claim 12, where the one or more acoustic properties are determined based further on an orientation of the non-player entity.

17. The computing system of claim 12, where the one or more cues include one or more of a direction from which the sound propagates, a direction in which the non-player entity is oriented, an onset delay indicating a duration for the sound to travel to the non-player entity, a reflections delay indicating a duration from a time at which the sound starts to be emitted until the non-player entity hears a first reverberation, a loudness of the sound as heard by the non-player, a reverberation decay time indicating a duration taken for reverberation of the sound to decay by a threshold magnitude from a maximum loudness of the sound, a reflections transfer matrix indicating a reverberation power of the sound as heard by the non-player entity in each of a plurality of directions, and a measure of sound emitted by the audio source that travels through geometry between the audio source and NPE.

18. The computing system of claim 12, where the audio source is a physical audio source occupying a physical environment.

19. A method, comprising:
receiving a query on behalf of a non-player entity regarding an audio source, the query including a position of the non-player entity in a virtual environment, the non-player entity exhibiting behavior in an application based at least on the audio source;
based at least on the position of the non-player entity, accessing a position-indexed data structure comprising one or more pre-computed values for one or more audio cues, each value influencing a corresponding acoustic property of sound emitted by the audio source at a corresponding position in the virtual environment, each value being pre-computed prior to execution of the application; and
providing the one or more pre-computed values for the one or more audio cues to the application, where the application is configured to control behavior of the non-player entity based at least on the one or more pre-computed values.

20. The method of claim 19, where the one or more pre-computed values for the one or more audio cues vary as a function of one or more of a position of the audio source, an orientation of the audio source, and an orientation of the non-player entity.

* * * * *